US006483821B1

(12) United States Patent
Dabak et al.

(10) Patent No.: US 6,483,821 B1
(45) Date of Patent: Nov. 19, 2002

(54) CDMA MOBILE COMMUNICATIONS SYSTEM AND METHOD WITH IMPROVED CHANNEL ESTIMATION AND PILOT SYMBOL TRANSMISSION

(75) Inventors: Anand G. Dabak, Richardson, TX (US); Srinath Hosur, Dallas, TX (US); Timothy Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/294,722

(22) Filed: Apr. 19, 1999

Related U.S. Application Data
(60) Provisional application No. 60/082,671, filed on Apr. 22, 1998.

(51) Int. Cl.[7] ................................................ H04Q 7/00
(52) U.S. Cl. ........................ 370/329; 370/229; 370/335; 370/342; 375/130; 375/227; 375/340; 375/343
(58) Field of Search ................................ 370/335, 342, 370/441, 252, 328, 329, 479; 375/130, 140, 147, 144, 145, 149, 148, 340, 343

(56) References Cited

U.S. PATENT DOCUMENTS 5,875,215 A * 2/1999 Dobrica ........................ 375/344
6,178,194 B1 * 1/2001 Vasic ............................ 375/136
6,314,131 B1 * 11/2001 Roe et al. ..................... 375/227

OTHER PUBLICATIONS

"Digital Communication Through Fading Multipath Channels", John G. Proakis, Digital Communications, McGraw–Hill Series in Electrical and Computer Engineering, Third Edition, Chapter 14, 14–4–2, pp. 785–787.
"DS–CDMA Pilot and Data Symbol–Assisted Coherent Multistage Interference Canceller Using Repeatedly Updated Channel Estimation", Sawahashi, et al., IEEE ICCS/ISPACS '96, pp. 585–589.
"Pilot Assisted Coherent DS–CDMA Reverse–Link Communications With Optimal Robust Channel Estimation", Fuyun Ling, Motorola Inc., Cellular Infrastructure Group, IEEE '97, pp. 263–266.
"W–CDMA Mobile Radio Access Technology", Sawahashi, et al., MWE '97 Microwave Workshop Digest, pp. 41–46.

* cited by examiner

Primary Examiner—Lee Nguyen
Assistant Examiner—Danh C Le
(74) Attorney, Agent, or Firm—Pedro P. Hernandez; W. James Brady, III; Frederick J. Telecky, Jr.

(57) ABSTRACT

The present invention is an improved system and method for transmitting and receiving digital information over mobile communication channels. The present invention includes an enhanced channel estimator (34) which iteratively estimates channel amplitude and phase distortion from received pilot and data signal information at various time instants. The iterative channel estimation scheme of the present invention provides increased performance of the transceiver system which allows for efficiencies such as transmission of a minimal amount of pilot information and reduction in the transmitted power.

4 Claims, 4 Drawing Sheets

CDMA MOBILE COMMUNICATIONS SYSTEM AND METHOD WITH IMPROVED CHANNEL ESTIMATION AND PILOT SYMBOL TRANSMISSION

This application claims priority under 35 USC § 119(e)(1) of provisional application No. 60/082,671, filed Apr. 22, 1998.

TECHNICAL FIELD OF THE INVENTION

This invention relates to code division multiple access ("CDMA") mobile communications systems and more particularly to a CDMA mobile communications system with improved channel estimation and pilot symbol transmission.

BACKGROUND OF THE INVENTION

Various standards for third generation of mobile wireless communications system have emerged recently. These third generation mobile wireless communications systems are designed to provide a wide range of multimedia wireless communications services including full motion video, video conferencing and Internet access. These systems use modulation schemes such as wideband code division multiple access ("W-CDMA") to support data transfer rates up to 2 megabits per second (Mbps).

Code division multiple access ("CDMA") allows simultaneous transmission of information over a common channel by assigning each of the transmitted signals a unique code during transmission. In a wireless environment, a signal transmitted from one point to another arrives via many paths. This is because the transmitted signal bounces off anything, such as the ground, the air, mountains, buildings. etc., it comes into contact with. These multiple signals eventually arrive at some received point where they all add and subtract with each other, resulting, at times, in deep "fades" where there is very little signal strength. In some cases, the reception may be completely disabled. Furthermore, the multipath phenomenon is variable and unpredictable depending upon the locations of the transmitter and receiver. The multipath also changes with time as the environment changes.

However, by spreading the information energy over a wide bandwidth at the transmitter, and by despreading, that is, efficiently collecting the spread information energy at the receiver, signal fading due to multipath may be diminished. In general, the wider the bandwidth, the more resistant the signal is to multipath fading. Thus, while multipath signal fading may cause the narrow band cellular type signal (such as frequency division multiple access ("FDMA") or time division multiple access ("TDMA")) to be diminished considerably, only a very small portion of the W-CDMA energy is lost. Although this unique communication scheme has been known for several decades, the dramatic cost reduction brought about by the advent of integrated digital high speed custom components has recently made commercialization feasible.

A CDMA spread spectrum ("SS")signal is created by modulating the radio frequency ("RF") signal with a spreading sequence (a code consisting of a series of binary pulses) known as a pseudo-noise ("PN") digital signal because they make the signal appear wide band and "noise like". The PN code runs at a higher rate than the RF signal and determines the actual transmission bandwidth. The resulting signal has a low-power spectral density in any narrow portion of the band. Messages can also be cryptographically encoded to any level of secrecy desired with direct sequencing as the entire transmitted/received message is purely digital.

An SS receiver uses a locally generated replica pseudo noise code and a receiver correlator to separate only the desired coded information from all possible signals. A SS correlator can be thought of as a specially matched filter, i.e., it responds only to signals that are encoded with a PN code that matches its own code. Thus the SS correlator (SS signal demodulator) can be "tuned" to different codes simply by changing its local code. The correlator does not respond to man made, natural or artificial noise or interference. It responds only to SS signals with identical matched signal characteristics and encoded with the identical PN code. All CDMA users can thus share the same frequency channel because their conversations are distinguished by a unique digital code. Not surprisingly, this communications method is inherently private, as opposed to the current non-secure cellular radio scheme. Furthermore, the occupied bandwidth (10–20 MHz) and signal handling capability is higher than any other proposed modulation system including the narrow band N-CDMA system standardized (ITU standard IS95) for cellular radio (1.25 MHz) now being deployed primarily for voice services. Thus, the performance of W-CDMA in a wireless environment is far superior to any existing modulation scheme.

For coherent wireless communications, pilot symbol assisted or pilot channel assisted channel estimation schemes may be used. The pilot assisted methods allow a mobile station to acquire the timing of the forward CDMA channel (or a base station to acquire the tuning of the reverse CDMA channel), provides a phase reference for coherent demodulation, and provides a means for signal strength comparisons between base stations for determining when to handoff.

In a pilot symbol assisted method, a known periodic pilot symbol is spread and then inserted into the unknown spread data sequence, as shown in FIG. 1A. A channel estimating technique such as a simple averaging of the pilot symbols may then be used to provide a channel estimate used in maximal ratio combining at a rake receiver, not shown, as illustrated in FIG. 2. In the rake receiver, the signals of several correlation receivers belonging to the strongest multipath components are combined to provide an enhanced, higher quality signal.

In a pilot channel assisted method, the known pilot signal and the unknown data sequence are separately spread using two uncorrelated spreading sequences at the same chip rate. A exemplary frame structure for an exemplary pilot channel assisted estimation scheme is shown in FIG. 1B which includes a separate data channel 12 and pilot channel 15. Each frame 19 of length $T_r$=10 milli-seconds (ms) of pilot channel 15 information is split into N=16 slots 17, each of length $T_{slot}$=0.625 ms. Within each slot, the data channel 12 and pilot channel 15 transmit information in parallel although they may be at different rates, i.e., have different spreading factors.

An exemplary pilot symbol assisted scheme, on the other hand, as in FIG. 1A, proposes to insert four (4) pilot symbols in every time slot for 32, 64, and 128 kilo-symbol per second (KSPS) data channels and for the C4 KSPS downlink control channel and eight (8) pilot symbols in every time slot for data rates of 256, 512, and 1024 KSPS. The overhead associated with transmitting the pilots in each time slot is summarized in Table 1 hereinbelow.

TABLE 1

Current overhead for the transmission of pilot symbols

| Symbol rate (KSPS) | Number of pilot symbols per time slot in current standard | Number of symbols per time slot | Bandwidth overhead for current pilot symbol transmission |
|---|---|---|---|
| 32 | 4 | 20 | 20% |
| 64 | 4 | 40 | 10% |
| 128 | 4 | 80 | 5% |
| 256 | 8 | 160 | 5% |
| 512 | 8 | 320 | 2.5% |
| 1024 | 8 | 640 | 1.25% |

What is needed is an efficient channel estimation scheme which requires a minimal amount of pilot information.

SUMMARY OF THE INVENTION

The present invention includes an improved system and method for transmitting and receiving digital information over mobile communication channels. The present invention includes an enhanced channel estimator which iteratively estimates channel amplitude and phase distortion from received pilot and data signal information at various time instants.

An object of the interactive channel estimation scheme of the present invention is to allow for transmission of a minimal amount of pilot information.

Another object of the iterative channel estimation scheme of the present invention is to provide for improved performance while transmitting the same number of pilot symbols.

These and other features of the invention that will be apparent to those skilled in the art from the following detailed description of the invention, taken together with the accompanying drawings.

DETAILED DESCRIPTION OF THE INVENTION

Figure 3:
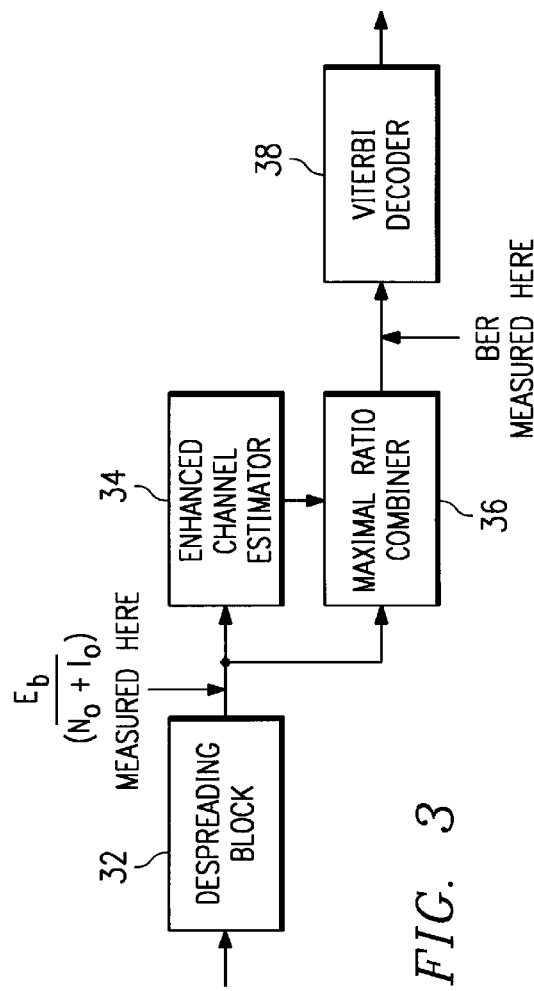
FIG. 3 depicts a generalized block diagram of a communications system which uses the enhanced channel estimator in accordance with the present invention.

The present invention is a iterative channel estimation system and method for receiving digital information over mobile communication channels. The digital receiver of the present invention, as shown in FIG. 3, includes a despreading block 32, an enhanced channel estimator 34, a maximal ratio combiner (MRC) 36, and a Viterbi decoder 38. Although the MRC 36 and the decoder 38 are defined as using a maximal ratio and Viterbi algorithms, respectively, other techniques for implementing these functions will be readily apparent to those skilled in the art.

Figure 4A:
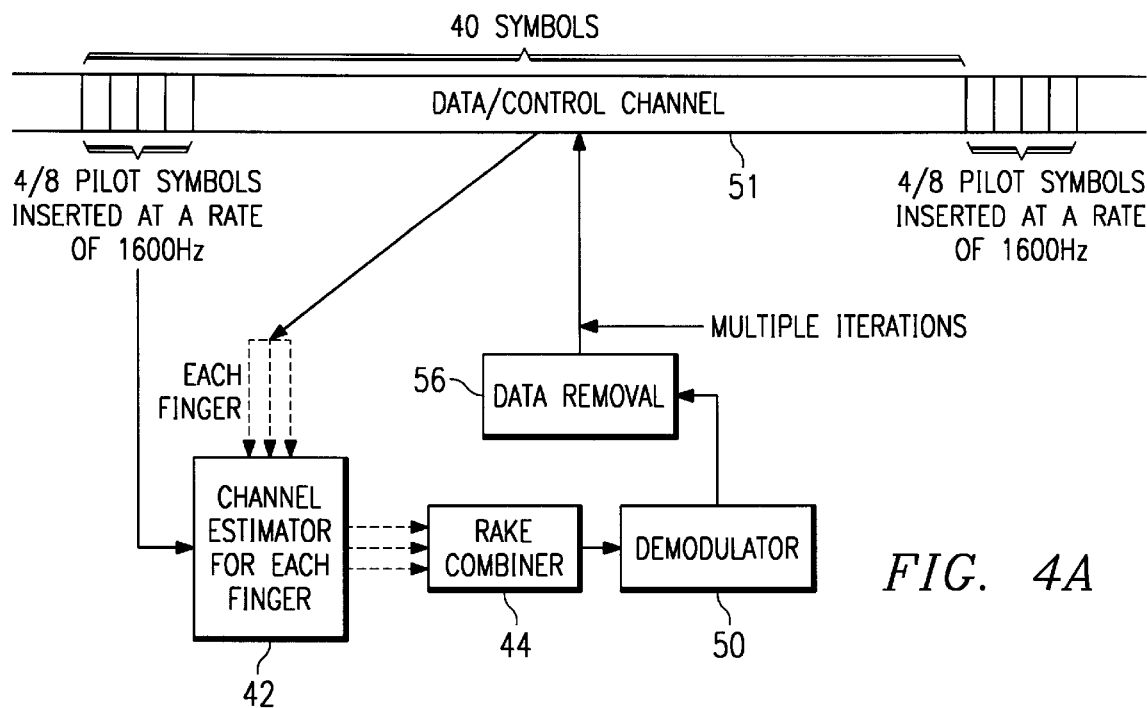
FIGS. 4A and 4B are detailed block diagrams of the channel estimation schemes in accordance with the present invention.

In a first embodiment of the present invention as shown in FIG. 4A, the enhanced channel estimator 34 performs an iterative estimation scheme which includes the steps of performing an initial channel estimation using channel estimator 42 using the received signal, combining the received signals from each finger at rake combiner 44, demodulating the data using demodulator 50, then removing the data symbols from the received signal using the demodulated data in data removal block 56. The resultant signal is then used to generate another channel estimate. This recursive process is repeated a number of times until a reliable channel estimate is obtained.

Figure 1A:
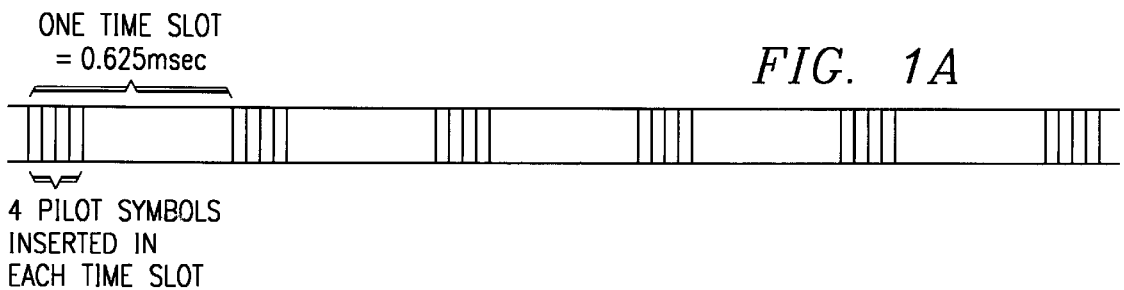
FIG. 1A shows an exemplary diagram illustrating insertion of pilot symbols into each time slot of a data channel.
Figure 1B:
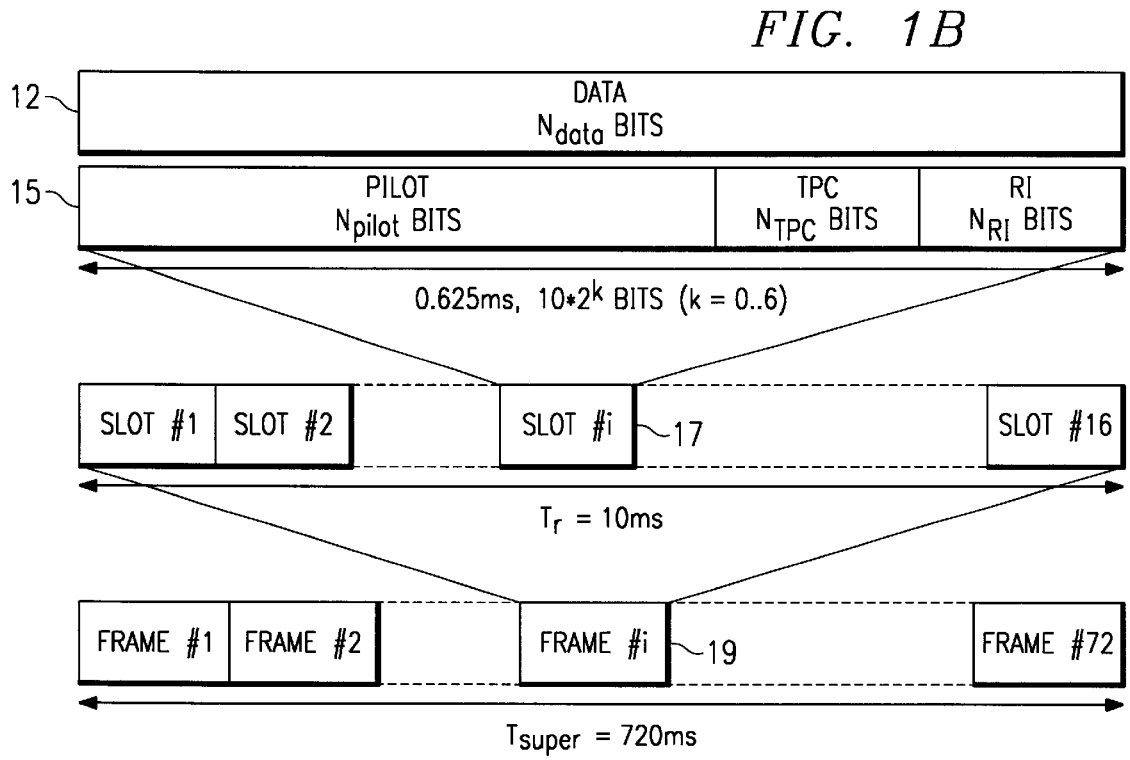
FIG. 1B is a diagram of an exemplary pilot channel transmitted separately from the data channel.
Figure 2A:
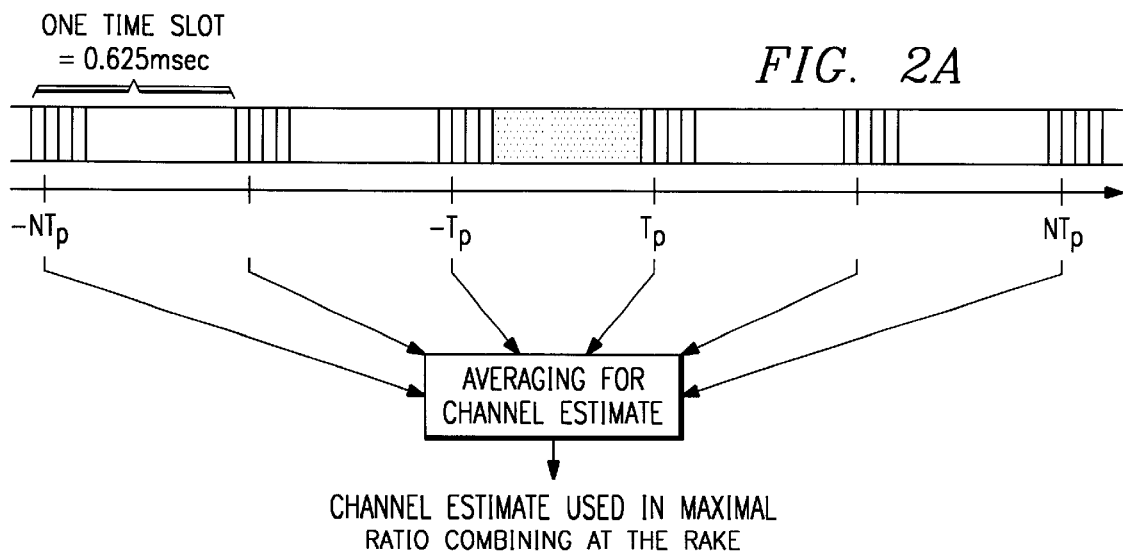
FIG. 2A is a block diagram of an exemplary channel estimation scheme.
Figure 2B:
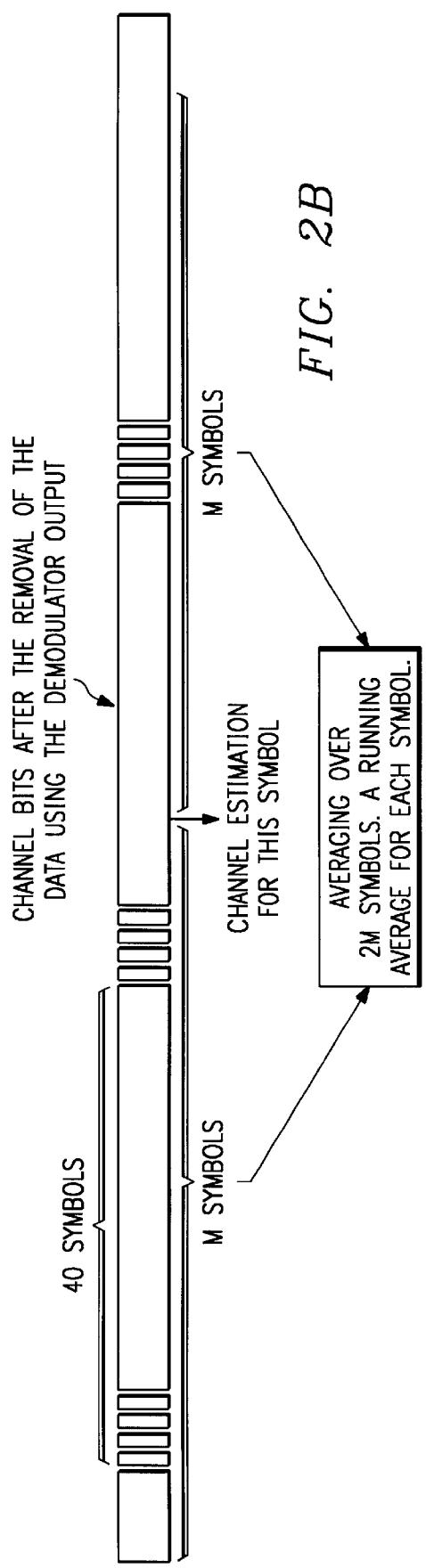
FIG. 2B shows a block diagram of al exemplary channel estimation scheme in accordance with the present invention.

The first iteration performed by the enhanced channel estimator 34 uses an averaging technique for channel estimation as illustrated in FIG. 2A. The demodulator 50 output using this channel estimate is then used to remove the modulation of the data symbols from the incoming signal at the data removal block 56. A new channel estimate is then performed using the resulting signal by averaging over 2M symbols as shown in FIG. 2B. The procedure can be repeated iteratively.

Figure 4B:
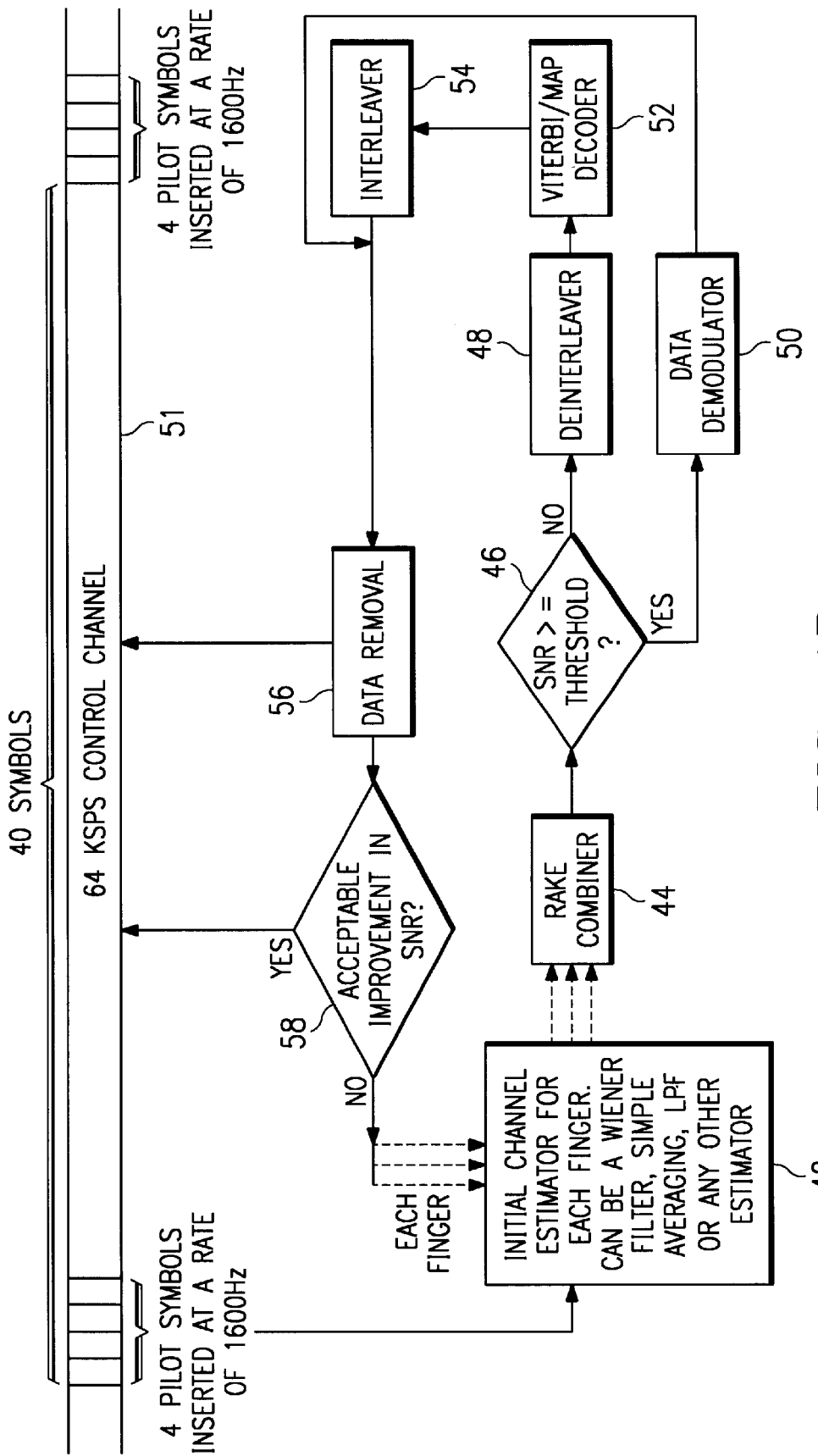

As shown in FIG. 4, the preferred embodiment of the enhanced channel estimator 34 of the present invention receives blocks of digital data transmitted over the mobile communications channels. An exemplary block of digital data is shown in FIG. 4 at 51 which includes forty (40) symbols transmitted over a 64 kilo symbols per second (KSPS) control channel. Each exemplary forty (40) symbol digital data block includes a group of four (4) pilot symbols inserted at a rate of 1600 Hertz (Hz) which are used for subsequent channel estimation. Although a pilot symbol assisted scheme is used to illustrate the operation of the present invention, a pilot channel assisted scheme in which the pilot information and data are sent over separate channels may also be used. If the pilot channel assisted scheme is used, the resulting channel estimation information from the pilot channel and the resulting channel estimation information from the data channel information are averaged together.

Initial channel estimation of the received blocks of data is performed by the initial channel estimator 42. The initial channel estimator 42 performs an open loop channel estimation and can be implemented using a Wiener filter, simple averaging, a low pass filter, or any other channel estimator as will be apparent to one or ordinary skill in the art. The Wiener filter is preferred provided that the fading rate and the value of $E_b/\eta_0$ (where $E_b$ is the received signal energy-per-bit and $\eta_0$ is the noise spectral density) are known. If multiple pilot channels are used, all or any combination of the pilot channels may be used to determine the initial channel estimate.

The enhanced channel estimator 34 of the present invention also includes rake combiner 44 which despreads the received signals by combining the received blocks of digital data from the various multipath sources. It is also contemplated that the received signals from each finger may also be processed individually in which case the rake combiner 44 is bypassed.

A mechanism for determining the signal-to-noise ratio (SNR) is included at block 46. If, at block 46, the available SNR on the channel is high enough to provide an acceptable level of reliability, the data is demodulated using data demodulator 50. The resulting demodulated data is then used for data removal at block 56.

If the SNR as determined at decision block 46 is not high enough to provided an acceptable level of reliability in the demodulated data, another mechanism is used. In particular, for a less than desirable SNR level, data removal at block 56 is performed using the received data after it has been deinterleaved using deinterleaver 48, decoded using Viterbi/MAP Decoder 52, and interleaved again using interleaver 54.

The interleaver 54 scrambles the order of the bytes which make up the encoded data. This technique is used so that bursty channel errors are spread out in the re-ordered bytes. The deinterleaver 48, on the other hand, re-orders the bytes of the encoded message.

Once the data removal at block 56 has been performed, a determination is made at decision block 58 as to whether or not the improvement in the SNR from the previous channel estimate as performed by initial channel estimator 42 is acceptable. The number of times the iteration is performed is determined based on the desired SNR chosen for the system. The higher the desired SNR, the higher the number of iterations that are performed. Thus, if the gain in the SNR from the previous channel estimate (or if the pre-determined number of iterations have not yet been performed), the signal remaining after the data symbols are removed is used by the initial channel estimator 42 to perform another channel estimation. The process is repeated a pre-determined number of times or until the gain in the SNR from the previous channel estimate is acceptable.

Figure 5:
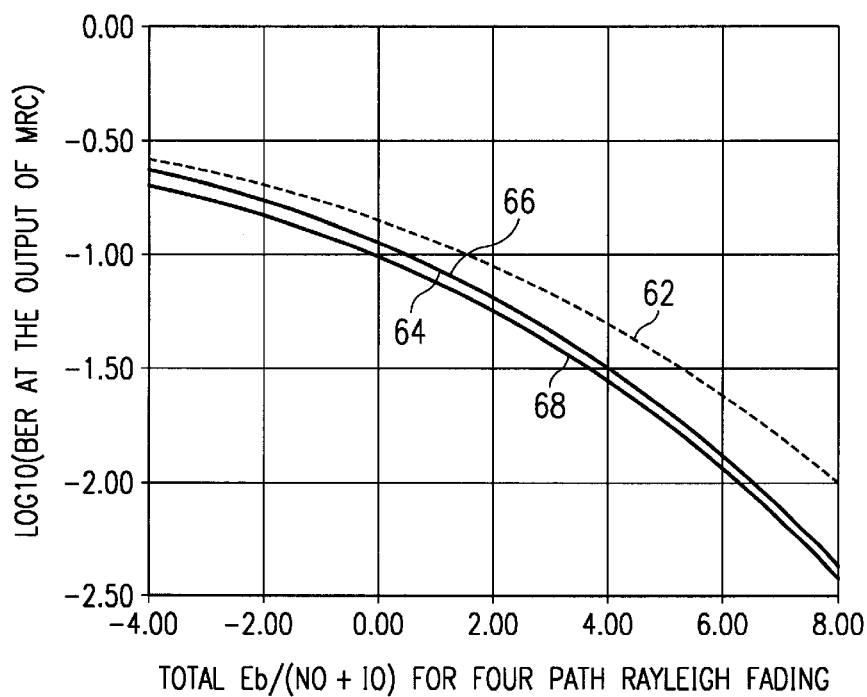
FIG. 5 depicts a graph showing BER versus SNR illustrating improvement achieved using the iterative channel estimation technique in accordance with the present invention over an averaging channel estimation technique.

Referring to FIG. 5, as an example, a plot of the SNR, as calculated using the formula $$\frac{E_b}{\eta_0 + I_0}$$

and determined at the output of the despreading block 32 shown in FIG. 3, versus the resultant bit error rate (BER) at the output of the MRC 36 for the averaging channel estimation scheme and for the iterative channel estimation scheme of the present invention is shown for a symbol rate of 64 KSPS and four path Rayleigh fading with a Doppler rate of 213 Hz.

The signal at 62 in FIG. 5 represents the averaging channel estimation technique over two time slots. The signal data at 64 in FIG. 5 represents the iterative channel estimation technique of the present invention after the first iteration. The signal data shown at 66 in FIG. 5 represents the iterative channel estimation technique of the present invention after the second iteration. And the signal data shown at 68 in FIG. 5 represents an ideal channel estimation.

Thus the iterative channel estimation technique in accordance with the present invention (as illustrated at 64 and 66 in FIG. 5) provides significant SNR gain over simple averaging for channel estimation (as illustrated at 62 in FIG. 5).

Assume the FEC coding rate to be rate ⅓, K=9 and the desired BER at the output of the Viterbi decoder 38 in FIG. 3 to be $10^{-3}$. Looking up standard BER curves, to achieve the desired BER, $$\frac{E_b}{\eta_0 + I_0}$$

must be 2.25 dB at the output of the Viterbi decoder 38 which in turn implies that $$\frac{E_b}{\eta_0 + I_0}$$

has a value of 2.25−log 10(3)=−2.27 at the input of the Viterbi decoder 38 for an additive white Gaussian noise (AWGN) channel.

Looking up the BER for an AWGN channel from the standard BER curves, the desired BER is 0.1445 at the input of the Viterbi decoder 38. Now, looking up the topmost curve in FIG. 5 a SNR, $$\frac{E_b}{\eta_0 + I_0},$$

value of −0.1355 dB (4.6345 dB at the output of the Viterbi decoder 38) is necessary if the averaging technique for channel estimation is used. On the other hand, the same BER can be achieved at an SNR, $$\frac{E_b}{\eta_0 + I_0}$$

value of −1.1 dB (3.67 dB at the output of the Viterbi decoder 38) using one iteration and at −1.25 dB (3.52 dB at the output of the Viterbi decoder 38) using two iterations of the iterative channel estimation technique of the present invention. Thus, the net gain is 0.9645 dB using one iteration and 1.1145 dB using two iterations of the iterative channel estimation technique of the present invention. Similar curves are obtained for different combinations of the symbol rates, Doppler rates and fading conditions.

Instead of plotting all of the curves, the gain in SNR, $$\frac{E_b}{\eta_0 + I_0}$$

expected using the iterative channel estimator in accordance with the present invention is tabulated hereinbelow in Table 3.

TABLE 3

Estimated gain in SNR, $\frac{E_b}{\eta_0 + I_0}$, from using iterative channel estimation in accordance with the present invention over averaging the channel values over pilot symbols.

| Symbol rate (KSPS) | 32 | 32 | 32 | 32 | 32 | 32 | 64 | 64 | 64 | 64 | 64 | 64 |
|---|---|---|---|---|---|---|---|---|---|---|---|---|
| Number of Rayleigh fading paths | 2 | 2 | 2 | 4 | 4 | 4 | 2 | 2 | 2 | 4 | 4 | 4 |

TABLE 3-continued

Estimated gain in SNR, $\frac{E_b}{\eta_0 + I_0}$, from using iterative channel estimation in accordance with the present invention over averaging the channel values over pilot symbols.

| | | | | | | | | | | | | |
|---|---|---|---|---|---|---|---|---|---|---|---|
| Maximum Doppler rate (Hz) | 213 | 213 | 213 | 213 | 213 | 213 | 213 | 213 | 213 | 213 | 213 | 213 |
| Actual Doppler rate (Hz) | 5 | 80 | 213 | 5 | 80 | 213 | 5 | 80 | 213 | 5 | 80 | 213 |
| Number of slots, N | 2 | 2 | 2 | 2 | 2 | 2 | 2 | 2 | 2 | 2 | 2 | 2 |
| Number of symbols, M | 32 | 32 | 32 | 32 | 32 | 32 | 64 | 64 | 64 | 64 | 64 | 64 |
| $E_b\eta_0$, ideal (dB) | −1.28 | −1.28 | −1.28 | −1.91 | −1.91 | −1.91 | −1.28 | −1.28 | −1.28 | −1.91 | −1.91 | −1.91 |
| $E_b\eta_0$, averaging channel estimation (dB) | −0.28 | −0.20 | 0.23 | −0.44 | −0.40 | −0.13 | −0.28 | −0.21 | 0.22 | −0.44 | −0.40 | −0.14 |
| $E_b\eta_0$, iterative channel estimation, 1 iteration (dB) | −0.50 | −0.47 | −0.32 | −1.12 | −1.11 | −1.01 | −0.53 | −0.50 | −0.39 | −1.19 | −1.17 | −1.10 |
| $E_b\eta_0$, iterative channel estimation, 2 iterations (dB) | −0.52 | −0.51 | −0.39 | −1.21 | −1.20 | −1.12 | −0.57 | −0.55 | −0.48 | −1.31 | −1.30 | −1.25 |
| $E_b\eta_0$ gain for iterative channel estimation, 1 iteration (dB) | 0.22 | 0.27 | 0.55 | 0.68 | 0.71 | 0.88 | 0.25 | 0.29 | 0.61 | 0.75 | 0.77 | 0.96 |
| $E_b\eta_0$ gain for iterative channel estimation, 2 iterations (dB) | 0.24 | 0.31 | 0.62 | 0.77 | 0.80 | 0.99 | 0.29 | 0.34 | 0.70 | 0.87 | 0.90 | 1.11 |
| Estimated extra MIPS for iterative channel estimation, 1 iteration | 0.16 | 0.16 | 0.16 | 0.16 | 0.16 | 0.16 | 0.32 | 0.32 | 0.32 | 0.32 | 0.32 | 0.32 |
| Estimated extra MIPS for iterative channel estimation, 2 iterations | 0.32 | 0.32 | 0.32 | 0.32 | 0.32 | 0.32 | 0.64 | 0.64 | 0.64 | 0.64 | 0.64 | 0.64 |

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. Apparatus for receiving digital information over mobile communication channels, said apparatus comprising:

means for receiving blocks of digital data transmitted over the mobile communications channels, said blocks of digital data includes pilot symbols periodically inserted into said blocks of digital data for subsequent channel estimation;

means for performing channel estimation using said received blocks of digital data using an iterative channel estimating procedure;

means for combining said received blocks of digital data; and means for decoding said combined blocks of digital data to retrieve transmitted information; and said channel estimation means includes:

means for determining an initial channel estimation from said received blocks of digital data;

means for combining said received blocks of digital data, said combined data having an associated signal-to-noise ratio;

means for determining said associated signal to noise ratio;

means for demodulating said combined data by a first method if said associated signal-to-noise ratio at least meets a first pre-determined threshold and for demodulating said combined data by a second method otherwise;

means for removing said digital data from said demodulated signal to generate an updated channel signal; and means for determining whether improvement in said associated signal to noise ratio at least meets an acceptable level.

2. A method of transmitting and receiving digital information over mobile communication channels, said method comprising the steps of:

(a) receiving blocks of digital data transmitted over mobile communications channels, said blocks of digital data includes pilot symbols periodically inserted into said blocks of digital data for subsequent channel estimation;

(b) performing channel estimation using said received blocks of digital data using an iterative channel estimation technique; and (c) retrieving transmitted information from said received blocks of digital information in accordance with said channel estimation; and (d) generating an initial channel estimation using said received blocks of digital data;

(e) combining said received blocks of digital data, said combined data having an associated signal-to-noise ratio;

(f) determining said associated signal to noise ratio;

(g) demodulating said combined data by a first method if said associated signal-to-noise ratio at least meets a first pre-determined threshold;

(h) demodulating said combined data by a second method if said associated signal-to-noise ratio is less than said first pre-determined threshold to generate estimated data symbols; and (i) removing said estimated data symbols from said received blocks of digital data to generate an updated channel signal.

3. The method of claim 2 further including the steps of:

(j) if improvement in said associated signal to noise ratio from a previous level is not acceptable, recalculating said initial channel estimate using said updated channel signal; and (k) repeating steps (f) through (i) using said recalculated channel estimate until said improvement in said associated signal to noise ratio is acceptable.

4. The method of claim 2 further including the step of repeating steps (f) through (i) using said recalculated channel estimate a pre-determined number of times to reach a desired signal to noise ratio.

* * * * *